United States Patent Office 3,387,995

Patented June 11, 1968

3,387,995

PRODUCTION OF MAGNETIC RECORDING MEDIA USING COPOLYAMIDE BENDER FOR FERROMAGNETIC POWDER

Werner Senkpiel, Karl Dachs, Hans Wilhelm, and Herbert Wagner, Ludwigshafen (Rhine), Guenter Becht, Speyer, and Gerhard Werst, Neustadt, Weinstrasse, Germany, assignors to Badische Anilin- & Soda-Fabrik Aktiengesellschaft, Ludwigshafen (Rhine), Germany No Drawing. Filed Mar. 17, 1964, Ser. No. 352,632
Claims priority, application Germany, Mar. 23, 1963, B 71,276
3 Claims. (Cl. 117—138.8)

ABSTRACT OF THE DISCLOSURE

Manufacture of magnetic recording media in which a ferromagnetic powder is applied to a film in admixture with a linear polyamide binder composed of 50 to 100% by weight (with reference to the total weight of the binder) of monomeric units which are salts of (A) omega, omega'- octane- or omega,omega'-nonane-dicarboxylic acids bearing an aliphatic hydrocarbon substituent of 8 or 9 carbon atoms in a continuous chain and (B) diamines of 8 to 20 carbon atoms. An example of the essential polyamide-forming component is the salt of heptadecane dicarboxylic acid and p,p'-diaminocyclohexylmethane.

This invention relates to a process for the production of layered magnetic recording media comprising one or more layers of magnetizable powdered substances and a binder of copolyamides for video, impulse and sound recording.

The preparation of magnetic recording media by coating a backing, such as a sheet, a wire or a filament of plastics or metal, with a dispersion of a magnetizable substance is known in which film-forming substances, such as cellulose ethers, cellulose esters, polyvinyl chloride, polyesters, polyurethanes or solvent-soluble cocondensation products of a plurality of components forming linear polyamides are used as binders.

It has been found that the plastics used do not always satisfy technical requirements, such as abrasion resistance, mechanical and chemical resistance, resistance to high temperatures, compatibility with the magnetizable substance and dimensional stability.

We have found that magnetic recording media having particularly advantageous properties for magnetic video, impulse and sound recording can be prepared by application of ferromagnetic powders which are suspended in a solution of a binder comprising a cocondensation product of a plurality of components forming linear polyamides, to a sheet, with or without the use of an adhesion agent, by using as the binder a copolyamide which contains in polymerized form, with reference to the total weight of the polyamides, 50 to 100% of linear polyamide forming components having eight to twenty carbon atoms. Copolyamides are polyamides which have been obtained by polymerizing a mixture of different polyamide forming components.

Magnetic recording media prepared according to this invention have inter alia a high abrasion resistance and good dimensional stability.

Examples of suitable components having eight to twenty carbon atoms which form linear polyamides are capryllactam, capric lactam, laurolactam, branched lactams bearing substituents on carbon: C-ethyl-epsilon-caprolactam, C-ethyl-zeta-oenantholactam, the aminocarboxylic acids of these lactams; mixtures or salts of aliphatic dicarboxylic acids, which may be branched, such as suberic acid, azelaic acid, sebacic acid, dodecane dicarboxylic acid, $\alpha$-ethylsuberic acid, or other branched dicarboxylic acids, such as $\alpha,\alpha'$-diethyladipic acid, or preferably omega,omega'-octane or -nonane dicarboxylic acids which contain as substituents higher aliphatic hydrocarbon radicals having at least eight or nine carbon atoms in a continuous chain and which may be prepared for example according to the process of German Patent Specification No. 1,006,849, or aromatic dicarboxylic acids, such as isophthalic acid, and diamines, such as octamethylene diamine, nonamethylene diamine, decamethylene diamine, which, like the dicarboxylic acids, may bear aliphatic or aromatic radicals, for example m-xylene diamine or 4,4'-diaminodicyclohexylmethane. The said compounds may be used mixed with each other or mixed with other components which form linear polyamides, such as caprolactam, adipic acid, pentamethylene diamine, hexamethylene diamine and their C-substituted derivatives or salts or mixtures of the last-mentioned dicarboxylic acids and the diamines.

The dispersion which contains the magnetizable substance and the dissolved polyamide to be used according to this invention is preferably prepared by a conventional method by homogenizing the ferromagnetic material with the solvent and binder, for example in a ball mill.

The ratio of ferromagnetic material to binder may be varied within wide limits, for example from 2:1 to 5:1, preferably from 3:1 to 4:1.

Magnetite, acicular iron oxide (gamma-$Fe_2O_3$) or metallic substancs, such as iron powder, are suitable ferromagnetic substances.

Solvents conventionally used for polyamides or mixtures thereof with swelling agents and non-solvents are suitable, for example aliphatic alcohols, such as methanol, ethanol, propanol, isopropanol, n-butanol, isobutanol; araliphatic alcohols, such as benzyl alcohol or mixtures thereof with water, aromatic and aliphatic hydrocarbons, esters, ketones, glycol ethers, ether nitriles, or mixtures which may consist of two or three of the said compounds, for example alcohols with water, aromatics, water and alcohols, such as benzene/methanol/water.

The type of solvent or solvent mixture used depends on the type of copolyamide used according to the invention.

Polyesters, polyvinyl chloride and cellulosetriacetate are suitable as backing for the magnetizable layer.

The magnetizable layer is applied to the backing by conventional methods. For example the frromagnetic layer may be united with the backing by application by means of rollers or by pouring the dispersion.

The good compatibility of the binder used according to this invention with the magnetizable material, for example with acicular iron oxide, makes it possible to distribute the iron oxide particles uniformly without changing their magnetic properties.

Moreover these magnetizable layers have a high surface smoothness with a uniformly high pigment density (grams of iron oxide particles per cc.).

An advantage resulting from this is that magnetic recording media provided with such a layer cause extremely low wear on the recording and reproducing heads. The life of the magnetic head is more than five times as long when using layered magnetic recording media having binders according to this invention than when using prior art magnetic recording media. The wear of a magnetic recording medium prepared with a binder according to this invention is compared below with that of magnetic recording media which have been prepared with prior art binders:

| Binder | Wear of head in mg. per 1000 m. of tape |
|---|---|
| According to this invention | 0.06 to 0.07 |
| Polyurethane | 0.11 |
| Polyvinyl chloride | 0.23 |

Wear of recording and reproducing heads is determined by the following method: A loop 20 m. in length of a magnetic recording medium in tape form is passed at constant speed over a small circular plate of Mu-metal (a material used for manufacturing recording heads) while being pressed against it with a pressure of 60 g. Wear of the small plate is determined by microscopic measurement of the length of the chord at the point of abrasion and calculating the decrease in weight therefrom.

Binders according to this invention moreover have high abrasion resistance which is clearly superior to that of binders hitherto used.

The abrasion values of prior art binders are compared in the following table with the abrasion value of a binder according to this invention:

TABLE

| Binder used | Abrasion in microns |
|---|---|
| Polyvinyl chloride | 1.4 |
| Copolymer based on vinyl chloride and vinyl acetate in the ratio 1:1 | 1.1 |
| Copolymer based on styrene and acrylonitrile in the ratio 78:22 | 1.0 |
| Polyurethane resin | 0.8–0.9 |
| Binder according to this invention (Example 1) | 0.6–0.7 |

Abrasion resistance is determined by the following method: A magnetic recording medium in tape form with a definite magnetization is passed over a defined roughened surface while being pressed against it under a defined pressure. The decrease in layer thickness of the tape is determined by electroacoustic measurement of the decrease in sensitivity.

Adhesion of the binder to be used according to this invention to the backing, for example of polyvinyl chloride, acetyl cellulose or polyester based on terephthalic acid and ethylene glycol, may be improved by the use of an adhesion agent of polyesters soluble in solvents. Polycondensates having a K-value of 30 to 40 and prepared from terephthalic acid, isophthalic acid and ethylene glycol are particularly suitable as adhesion agents. The adhesion agent is applied in the conventional way by means of rollers.

When more than one superposed layer of magnetizable substance is used, it is only necessary to use a binder according to this invention in the layer which comes into contact with the recording or reproducing head, without the quality being affected.

The invention is illustrated by the following examples. The parts specified in the examples are parts by weight.

Example 1

6 parts of acicular iron oxide (gamma-$Fe_2O_3$) having a particle size of 0.8 to 1 micron and a coercive force of 300 oersteds is homogenized with a solution of 2.3 parts of a condensation product of a mixture of 80 parts of a salt of heptadecane dicarboxylic acid and p,p'-diaminodicyclohexylmethane and 20 parts of capryllactam (K-value 50, measured according to H. Fikentscher, Cellulosechemie, 13, 58 (1932)), 15 parts of a mixture of 90 parts by volume of ethanol and 10 parts by volume of benzene with an addition of 0.1 part of a mixture of emulsifiers consisting of triethanolamine monooleic acid ester and the corresponding diesters and triesters. The dispersion is applied to a polyester film (based on terephthalic acid and ethylene glycol) having a thickness of 20 microns in the conventional way with the simultaneous action of a magnetic field. The thickness of the dry magnetic recording layer on the polyester foil is 12 microns. The iron oxide content is about 1.55 g./cc. The abrasion of the magnetizable layer is 0.68 micron, the wear on the magnetic head is 0.067 mg.

At a tape speed of 38 cm. per second, a sensitivity of +1.5 db with reference to DIN standard tape 38 (DIN 45513) and a harmonic distortion of 41 db are measured according to broadcasting conditions (Pflichtenheft der Arbeitsgemeinschaft der Rundfunkanstalten der Bundesrepublik Deutschland). The electro-acoustic properties of these films may be further improved for particular applications by applying to the backing, prior to the application of the magnetizable material, an adhesion agent (based on phthalic acid, isophthalic acid and ethylene glycol) and calendering the coated film.

Equally good results are obtained by using polyamides according to this invention which have been prepared by polymerization of a mixture of (A) 20 parts of caprolactam and (B) 80 parts of a salt of heptadecane dicarboxylic acid and p,p'-diaminodicyclohexylmethane or a mixture of 20 parts of caprolactam, 20 parts of capryllactam, 20 parts of a salt of adipic acid and hexamethylene diamine and 40 parts of a salt of heptadecane dicarboxylic acid and p,p'-diaminodicyclohexylmethane.

Example 2

A homogeneous dispersion is prepared by a conventional method from a mixture of 1.2 parts of acicular iron oxide (gamma-$Fe_2O_3$) (particle size about 0.8 micron, coercive force 290 oersteds) and a solution of 0.46 part of a condensation product of a mixture of 80 parts of a salt of heptadecane dicarboxylic acid and p,p'-diaminodicyclohexylmethane and 20 parts of laurolactam (K-value 42) in 3.1 parts of a solvent mixture of 80 parts of volume of n-butanol and 20 parts by volume of benzene. This dispersion is applied to a polyester film (based on terephthalic acid and ethylene glycol) having a thickness of 20 microns, a magnetic field acting thereon at the same time. The thickness of the dry magnetic recording layer on the backing is 12 microns and the iron oxide content is 1.5 g./cc. Abrasion of the layer is about 0.61 micron and wear of the magnetic head 0.067 mg. According to broadcasting conditions (ibid.), a sensitivity of +2.0 db. with reference to DIN standard tape 38 (DIN 45513) and a harmonic distortion of 41.5 db are measured at a tape speed of 38 cm. per second.

Example 3

A film of polyvinyl chloride having a thickness of 75 microns is coated with a layer about 0.5 micron in thickness of a polyester (based on phthalic acid, isophthalic acid and ethylene glycol) which is soluble in methylene chloride and then provided with a layer 18 microns in thickness of a dispersion having the following composition while being subjected to the action of a magnetic field: 35 parts of acicular iron oxide, 13.4 parts of a polycondensation product of a mixture of 80 parts of a salt of heptadecane dicarboxylic acid and p,p'-diaminocyclohexylmethane and 20 parts of capryllactam, 89.4 parts of a solvent consisting of 33.3 parts by volume of ethanol, 33.3 parts by volume of benzene and 33.3 parts by volume of butanol, and also 0.35 part of palmitic acid. Wear on the head is 0.065 mg. and abrasion of the layer is about 0.65 micron; the iron oxide content (oxide density) is 1.4 g./cc. At a tape speed of 19 cm. per second, a sensitivity of +1.6 db with reference to DIN standard tape 19 (DIN 45513) and a harmonic distortion of 45 db are measured.

Example 4

A mixture of 600 parts of the iron oxide described in Example 1 is homogenized in a ball mill with a solution of 150 parts of a condensation product having a K-value of 40 of a mixture of 80 parts of a salt of heptadecane dicarboxylic acid and p,p'-diaminodicyclohexylmethane and 20 parts of capryllactam, 700 parts of a solvent mixture of 50 parts by volume of toluene and 50 parts by volume of n-propanol in the presence of 24 parts of stearic acid as dispersing agent. The dispersion is applied under the action of a magnetic field to a polyester film having a thickness of 24 microns which has been provided with a layer about 0.5 micron in thickness of the adhesion agent described in Example 3, and the coated film is calendered. The thickness of the magnetic recording layer is 9 microns and the content of iron oxide is 1.9 g./cc. The abrasion of the magnetizable layer is 0.8 micron. The wear on the magnetic head is less than 0.06 mg.

At a tape speed of 38 cm./sec. a sensitivity of −2.6 db, a frequency response of +3.6 db (with reference to DIN standard tape 38 (DIN 45513)) and a harmonic distortion of 29 db are measured according to the broadcasting conditions (ibid.).

Example 5

600 parts of the iron oxide described in Example 1 is ground with a solution of 200 parts of a condensation product having a K-value of 41.7 and obtained from a mixture of 80 parts of a salt of heptadecane dicarboxylic acid and p,p'-diaminodicyclohexylmethane and 20 parts of caprolactam, 900 parts of a solvent mixture of 50 parts by volume of toluene, 30 parts by volume of n-propanol and 20 parts by volume of ethanol in the presence of 24 parts of stearic acid in a conventional way to form a dispersion which is applied to a polyester film having a thickness of 24 microns while being exposed to a magnetic field and dried. The layer applied has a thickness of 10 microns and an iron oxide concentration of 1.7 g./cc. Abrasion of the layer is 0.70 micron and wear on the magnetic head is 0.07 mg.

Example 6

A solution of 100 parts of a condensation product having a K-value of 51.9 and obtained from 60 parts of a salt of heptadecane dicarboxylic acid and p,p'-diaminodicyclohexylmethane, 20 parts of caprolactam and 20 parts of AH-salt (from adipic acid and hexamethylene diamine), 300 parts of the acicular iron oxide described in Example 1 and 900 parts of a solvent mixture of 50 parts by volume of toluene and 50 parts by volume of n-propanol, are ground to a dispersion by a conventional method. This is applied under the action of a magnetic field to a backing of polyethylene terephthalate and dried.

The thickness of the magnetic recording layer is 13 microns, the content of iron oxide is 1.6 g./cc., the layer abrasion is 0.63 micron and the wear on the magnetic head is 0.07 mg.

We claim:

1. An improved magnetic recording media of high abrasion resistance comprising a filmaceous base to which there has been applied a ferromagnetic powder admixed in a binder consisting of a linear polyamide containing at least 50 up to 100% by weight (with reference to the total weight of the binder) of monomeric units selected from the class consisting of the salts of (A) omega, omega'-octane- and omega,omega'-nonane-dicarboxylic acids bearing an aliphatic hydrocarbon substituent of 8 to 9 carbon atoms in a continuous chain, and (B) diamines of 8 to 20 carbon atoms.

2. A magnetic recording media as claimed in claim 1 wherein said binder consists essentially of a linear polyamide of the components heptadecane dicarboxylic acid and p,p'-diaminocyclohexylmethane.

3. A magnetic recording media as claimed in claim 1 wherein said filmaceous base is a polyester of terephthalic acid and ethylene glycol.

References Cited

UNITED STATES PATENTS

| | | | |
|---|---|---|---|
| 3,284,360 | 11/1966 | Peshin | 252—62.5 |
| 2,071,250 | 2/1937 | Carothers | 260—106 |
| 2,937,028 | 5/1960 | Sipitilov | 274—41.4 |
| 2,941,901 | 6/1960 | Prill et al. | 117—76 |
| 2,991,198 | 7/1961 | Abeck et al. | 117—138.8 |
| 3,139,354 | 6/1964 | Wolff | 117—121 |
| 3,247,017 | 4/1966 | Eichler et al. | 117—138.8 |

FOREIGN PATENTS

| | | |
|---|---|---|
| 669,064 | 8/1963 | Canada. |

OTHER REFERENCES

Floyd, D. E., "Polyamide Resins," Reinhold Pub. Corp., New York (1958), pp. 39 to 47 and 138.

Spratt, H. G. M., "Magnetic Tape Recording," Heywood and Co., Ltd., London (1958), pp. 117–118.

WILLIAM D. MARTIN, *Primary Examiner.*

W. D. HERRICK, *Assistant Examiner.*

UNITED STATES PATENT OFFICE

CERTIFICATE OF CORRECTION

Patent No. 3,387,995 June 11, 1968

Werner Senkpiel et al.

It is certified that error appears in the above identified patent and that said Letters Patent are hereby corrected as shown below:

Column 2, line 16, "m-xylene" should read -- m-xylylene --; line 50, "frromagnetic" should read -- ferromagnetic --. Column 4, line 33, "80 parts of volume" should read -- 80 parts by volume --.

Signed and sealed this 16th day of December 1969.

(SEAL)
Attest:

Edward M. Fletcher, Jr.
Attesting Officer

WILLIAM E. SCHUYLER, JR.
Commissioner of Patents